US012281781B2

United States Patent
Doss et al.

(10) Patent No.: US 12,281,781 B2
(45) Date of Patent: *Apr. 22, 2025

(54) TOP LIGHTING AND INTERLIGHTING LUMINAIRE ASSEMBLY WITH MOVABLE LIGHT SOURCE

(71) Applicant: ABL IP HOLDING LLC, Atlanta, GA (US)

(72) Inventors: Michel Doss, Lachine (CA); Alin Ionut Petrescu, Lachine (CA); Bruno D'Amico, Lachine (CA); Eden Dubuc, Lachine (CA)

(73) Assignee: ABL IP Holding LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,895

(22) Filed: Oct. 27, 2023

(65) Prior Publication Data

US 2024/0052997 A1 Feb. 15, 2024

Related U.S. Application Data

(63) Continuation of application No. 17/708,499, filed on Mar. 30, 2022, now Pat. No. 11,835,209.
(Continued)

(51) Int. Cl.
*F21V 21/008* (2006.01)
*A01G 7/04* (2006.01)
(Continued)

(52) U.S. Cl.
CPC .............. *F21V 21/38* (2013.01); *A01G 7/045* (2013.01); *A01G 9/249* (2019.05); *F21V 17/02* (2013.01);
(Continued)

(58) Field of Classification Search
CPC ........ F21V 21/18; F21V 21/008; F21V 21/16; F21V 17/02; F21V 7/0091; F21V 14/04;
(Continued)

(56) References Cited

U.S. PATENT DOCUMENTS 6,499,862 B1   12/2002   Weigert et al.
10,941,927 B1   3/2021   Yang et al.
(Continued)

FOREIGN PATENT DOCUMENTS

CN   105333328 A   2/2016
JP   2013039035 A   2/2013
(Continued)

OTHER PUBLICATIONS

Information Disclosure Statement dated Jul. 25, 2022 which was filed in connection with U.S. Appl. No. 17/708,499.
(Continued)

*Primary Examiner* — Christopher M Raabe
(74) *Attorney, Agent, or Firm* — Kilpatrick Townsend & Stockton LLP (57) ABSTRACT

A lighting system includes a light source, a light redirection element, and a movement mechanism coupled to the light source and the light redirection element. The movement mechanism is configured to simultaneously or stepwise move the light source and the light redirection element between a top lighting position and an interlighting position.

11 Claims, 7 Drawing Sheets

Related U.S. Application Data (60) Provisional application No. 63/173,567, filed on Apr. 12, 2021.

(51) Int. Cl.
| | |
|---|---|
| *A01G 9/24* | (2006.01) |
| *F21V 17/02* | (2006.01) |
| *F21V 21/38* | (2006.01) |
| *F21Y 115/10* | (2016.01) |

(52) U.S. Cl.
CPC ......... *F21V 21/008* (2013.01); *F21Y 2115/10* (2016.08)

(58) Field of Classification Search
CPC ....... F21V 14/02; F21S 8/061; F21Y 2115/10; A01G 7/045; A01G 9/249
USPC ........................................................ 362/277
See application file for complete search history.

(56) References Cited

U.S. PATENT DOCUMENTS

| | | | | |
|---|---|---|---|---|
| 11,835,209 | B2 * | 12/2023 | Doss | ........................ F21V 21/38 |
| 2004/0109322 | A1 | 6/2004 | Desanto et al. | |
| 2013/0063930 | A1 | 3/2013 | Dubuc | |
| 2013/0283683 | A1 | 10/2013 | Ringbom et al. | |
| 2015/0070889 | A1 | 3/2015 | Sooferian | |
| 2015/0351325 | A1 | 12/2015 | Shelor et al. | |
| 2019/0082611 | A1 | 3/2019 | Speer | |

FOREIGN PATENT DOCUMENTS

| | | |
|---|---|---|
| WO | 2008041870 A2 | 4/2008 |
| WO | 2010109395 A1 | 9/2010 |

OTHER PUBLICATIONS

International Search Report and Written Opinion dated Jul. 25, 2022 which was issued in connection , vith PCT Application No. PCT/US22/22720.

892 Form dated Nov. 15, 2022 which was received in connection with U.S. Appl. No. 17/708,499.

892 Form dated Apr. 6, 2023 which was received in connection with U.S. Appl. No. 17/708,499.

892 Form dated Aug. 4, 2023 which was received in connection with U.S. Appl. No. 17/708,499.

Notice of Allowance dated Aug. 4, 2023 which was received in connection with U.S. Appl. No. 17/708,499.

* cited by examiner

TOP LIGHTING AND INTERLIGHTING LUMINAIRE ASSEMBLY WITH MOVABLE LIGHT SOURCE

CROSS REFERENCE TO RELATED APPLICATION

This application is a continuation of U.S. patent application Ser. No. 17/708,499 which was filed on Mar. 30, 2023 and which claims the benefit of U.S. Provisional Patent Application No. 63/173,567 which was filed on Apr. 12, 2021.

FIELD

Embodiments of the present disclosure generally relate to greenhouse lighting fixtures or luminaires. More particularly, embodiments relate to an improved greenhouse fixture or luminaire that is capable of providing both top and interlighting.

BACKGROUND

Greenhouses (or other interior growing locations) commonly use artificial supplemental light to encourage or promote plant growth. Plants such as vine crops or other large and/or tall plants are often cultivated within greenhouses, and artificial lighting is typically employed to direct light upon the plants to stimulate growth. Horticultural lighting in the form of luminaires are typically mounted to or suspended from (e.g., by cables) the roof or ceiling of the greenhouse. Top lighting is often used to direct light from above upon top surfaces and other horizontal surfaces of the plant canopy, and interlighting is sometimes used to direct light upon lateral surfaces of the plant or inside the plant canopy during different stages of growth.

The best location to place a luminaire in an interlighting arrangement is often in the aisle of the greenhouse in which an operator must work. This may, unfortunately, result in obstruction of the operator's movement. Another manner of interlighting is to place the luminaire within the plant canopy. Unfortunately, this presents challenges in preventing the leaves of the plant from burning due to high energy density of the light emitted from the luminaire. Another challenge that arises with top lighting is that it often can only be used during a portion of the year because the sun may already irradiate the top of the plants during portions of the year such as during summer. Additionally, top lighting can generate sun light shadow that result in reduction of growth in summer season.

Accordingly, it would be beneficial to develop luminaires capable of selective top lighting or interlighting, as desired, to solve the above problems.

BRIEF DESCRIPTION

Pursuant to some embodiments, a lighting system includes a light source, a light redirection element, and a movement mechanism coupled to the light source and the light redirection element. The movement mechanism is configured to simultaneously or stepwise move the light source and the light redirection element between a top lighting position and an interlighting position.

In one aspect, embodiments of the present disclosure relates to a luminaire or lighting system that includes a light source, a light redirection element, and a movement mechanism coupled to the light source and the light redirection element. The movement mechanism is configured to simultaneously or stepwise move the light source at a first vertical movement rate and the light redirection element at a second vertical movement rate. The movement mechanism is further configured to position, at a first time, the light source at a first vertical position and position the light redirection element at a first vertical distance from the light source to direct light from the light source to an object at a first emission direction. The movement mechanism is further configured to position, at second time, the light source at a second vertical position and position the light redirection element at a second vertical distance from the light source to direct light from the light source to the object at a second emission direction using the light redirection element.

In another aspect, embodiments of the present invention related to a method for top lighting and interlighting using a luminaire assembly. The method comprises simultaneously or stepwise moving, by a movement mechanism, a light source at a first vertical movement rate and a light redirection element at a second vertical movement rate. The movement mechanism is separately coupled to the light source and the light redirection element. The method further comprises positioning, at a first time, the light source at a first vertical position and the light redirection element at a first vertical distance from the light source to direct light from the light source to an object at a first emission direction. The method yet further comprises positioning, at second time, the light source at a second vertical position and the light redirection element at a second vertical distance from the light source to direct light from the light source to the object at a second emission direction using the light redirection element.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relate to a top lighting and interlighting luminaire assembly with movable light source for interior plant growth stimulation.

Figure 1A:
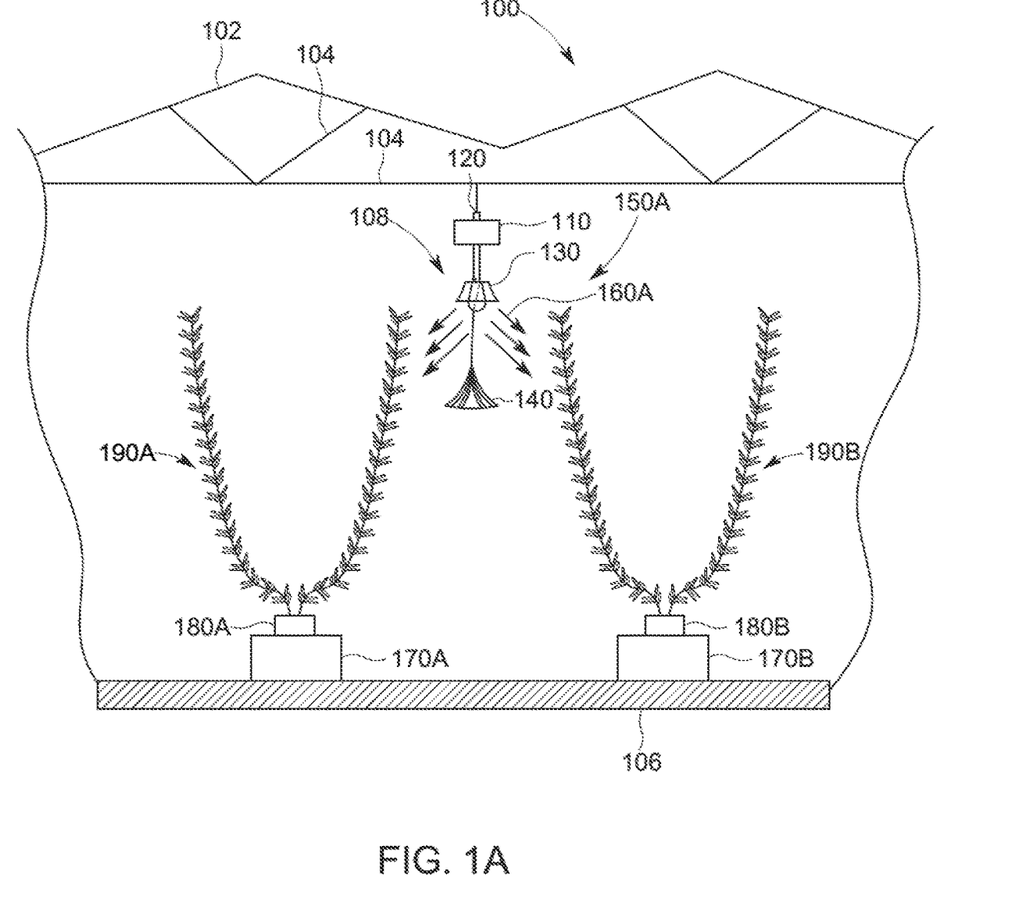
FIG. 1A is a view of a lighting system in which a luminaire is positioned in a first configuration in accordance with an embodiment of the present invention.

FIG. 1A illustrates a greenhouse 100 of any conventional construction. As used herein, the term "greenhouse" is generally used to refer to any building, facility, structure or portion thereof used to grow plants therein. The greenhouse 100 includes a roof 102 and frame structure 104. A plurality of luminaires 108 (although only one is shown in FIG. 1A, in a typical installation, multiple luminaires 108 may be used) in accordance with various embodiments of the present disclosure are suspended from the frame structure 104 (or from a ceiling or roof) of the greenhouse 100. The luminaire 108 may be suspended, hung or attached to the frame structure 104 at a mounting mechanism 120 by any conventional suspension element, such as chains, cables, hoist systems or the like. In some embodiments, rather than being suspended or attached to a frame structure 104, some or all of the luminaires 108 in a greenhouse 100 may be mounted or attached to risers, scaffolds or other elements designed to position the luminaires 108 above one or more rows of plants so that the luminaires 108 may be operated as described further herein. As used herein, the term "luminaire" is used to generally refer to a lighting unit or fixture that includes one or more lamps to distribute the light, to position and protect the lamps, and to connect the lamps to a power supply. For example, in some embodiments, the luminaires 108 include light emitting diode ("LED") lamps that emit light in order to promote plant growth. In some embodiments, the luminaires 108 may include lamps other than LED lamps.

In general, a luminaire 108 pursuant to some embodiments may include a movement mechanism 110, a light source 130 and a light redirection element 140. In practical application, a greenhouse 100 may include a plurality of luminaires 108. Further, in some embodiments, some or all of the luminaires 108 may include one or more movement mechanisms 110, light sources 130 and light redirection elements 140. Pursuant to some embodiments, the luminaire 108 (and individual components thereof as described further herein) may be adjustable in height relative to the roof 102 or frame structure 104 so that the luminaire 108 can be adjusted to accommodate increased height of the plants 190 during various growth phases of the plants 190 as well as to selectively and adjustably provide top lighting or interlighting as desired. More particularly, pursuant to some embodiments of the present invention, the movement mechanism 110 may be operated to control the position of the light source 130 as well as the position of the light redirection element 140.

Pursuant to some embodiments, a mounting mechanism 120 is provided to mount each movement mechanism 110 to the roof 102 or to a frame structure 104. In the illustrated embodiment, the greenhouse 100 forms an interior environment for growing plants. It should be appreciated that the greenhouse 100 is not limited to any particular frame structure, construction or the like and that plants grown in any interior location may benefit from the luminaires of the present invention.

As shown in FIG. 1A, the interior of the greenhouse 100 includes a first base 170A supporting a first planter 180A, and a second base 170B supporting a second planter 180B. The first planter 180A includes a first set of plants 190A planted therein, and the second planter 180B includes a second set of plants 190B planted therein. In a particular embodiment, the first set of plants 190A and the second set of plants 190B includes one or more plants in rows. The plants may be any variety of plant or crop grown indoors, such as vegetables, fruits, cannabis, or the like. In practical application, a greenhouse 100 may include a plurality of rows of plants 190 (and a plurality of luminaires 108 pursuant to the present invention to provide top and interlighting to those plants as described herein).

Figure 1B:
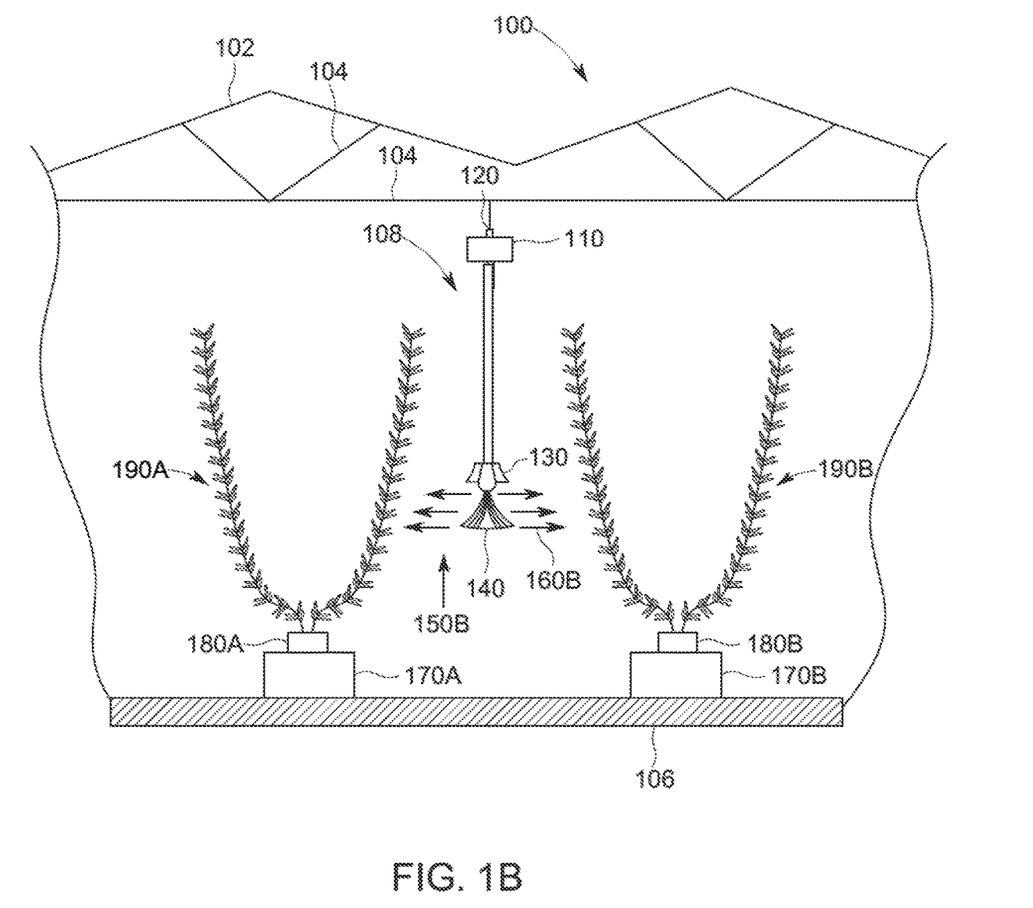
FIG. 1B is a further view of a lighting system in which a luminaire is positioned in a second configuration in accordance with an embodiment of the present invention.

In the view depicted in FIG. 1A, the luminaire 108 is positioned relatively near the top of the plants 190 (relative to the position of the luminaire 108 as shown in FIG. 1B, where the luminaire 108 is positioned lower). Further, in the view depicted in FIG. 1A, the light source 130 and the light redirection element 140 are positioned such that they are spaced apart so that the light emitted from the light source 130 is directed in a substantially downward direction (e.g., such that the light is generally directed downward at a top of the plants 190).

The light source 130 may include one or more light sources. In some embodiments, the one or more light sources include one or more light emitting diode (LED) modules. For example, each luminaire 108 may include one or more light sources 130 which extend along a length of the luminaire 108. Each light source 130 may include one or more LED light modules that include one or more spaced apart LEDs that extend along a longitudinal axis of the luminaire 108. Embodiments are not limited to any particular type of light source or LED, and may be, for example, high output LEDs, low power LEDs, a combination of multiple LEDs of the same or different wavelengths, or the like. The light source 130 may be provided in the form of an LED light strip, LED tube light, or any other configuration. While not shown in FIG. 1, the luminaire 108 may also include one or more optical elements and/or a cover. In general, the light source 130 is configured to emit light in a pattern and direction such as the first emission direction 160A of FIG. 1A.

Figure 2A:
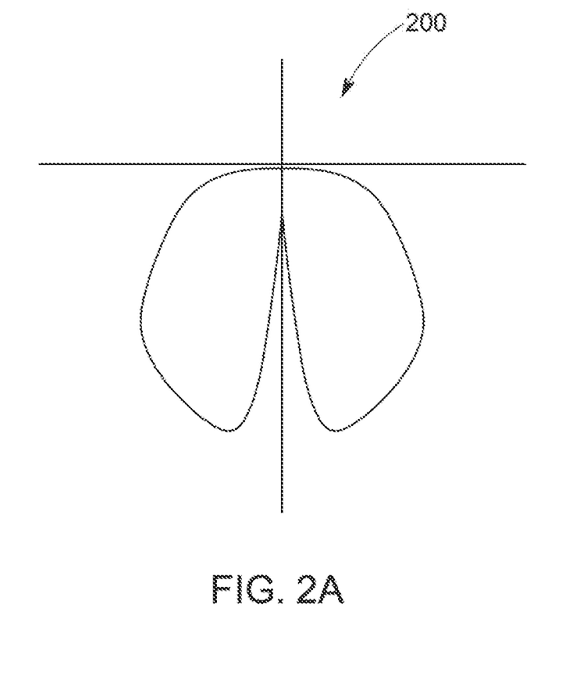
FIG. 2A is an illustration of a beam pattern of a light source of the luminaire of FIG. 1A.

The luminaire 108 also includes a light redirection element 140 which is coupled to the movement mechanism 110 (e.g., via a cable, chain, or the like). In general, both the light source 130 and the light redirection element 140 may be selectively positioned by operation of the movement mechanism 110. In one position, such as the position illustrated in FIG. 1A, the light redirection element 140 is positioned a distance apart from the light source such that the light emitted by the light source 130 is generally not direct toward (or redirected by) the light redirection element 140. That is, the movement mechanism 110 has caused the light redirection element 140 to be positioned a distance apart from the light source 130 so that the light source 130 can operate in a top light mode of operation as shown in FIG. 1A. A beam pattern 200 of the light emitted from the light source 130 is illustrated in FIG. 2A. As shown in FIG. 2A, the beam pattern 200 is substantially in a downward direction from the light source 130 (while the light source 130 is not shown in FIG. 2A, the light source is generally positioned at the intersection of the X and Y-axes of the beam pattern 200).

The movement mechanism 110 is coupled to each of the light source 130 and the light redirection element 140 and in some embodiments is configured to move the light source 130 at a first vertical movement rate and the light redirection element 140 at a second vertical movement rate in an upward or downward direction. For example, in some embodiments, the movement mechanism 110 is configured to substantially simultaneously move the light source 130 and the light redirection element 140 so that the light source 130 and the light redirection element 140 may be repositioned from a first position (e.g., such as a top light position or configuration or an interlighting position or configuration) to a second position.

In some embodiments, the first vertical movement rate is greater than the second vertical movement rate such that the light source 130 moves in the same vertical direction but in a greater vertical distance than the light redirection element 140. In some embodiments, the movement mechanism 110 is coupled to each of the light source 130 and the light redirection element 140 via one or more cables or chains.

In one or more embodiments, the light source 130 is configured to emit light in a substantially downward direction towards the light redirection element 140, and light redirection element 140 is configured to receive light emitted in the substantially downward direction and redirect the light in a substantially lateral second direction. In particular embodiments, the light redirection element 140 includes one or more of a reflector or a lens. In still other particular embodiments, the lens may be a total internal reflection (TIR) lens.

The movement mechanism 110 is further configured to position, at a first time, the light source 130 at a first vertical position 150A and position the light redirection element 140 at a first vertical distance from the light source to direct light from the light source to one or more of the first set of plants 190A and the second set of plants 190B at a first emission direction 160A. In the illustrated embodiment, the luminaire 108 is configured in a top lighting configuration in which a substantial portion (e.g., major portion) of the light emitting by the light source of light source 130 is not redirected by light redirection element 140 but instead falls upon one or more top surfaces of the first set of plants 190A and the second set of plants 190B.

The movement mechanism 110 is further configured to position, at second time, the light source of light source 130 at a second vertical position 150B and position the light redirection element 140 at a second vertical distance from the light source to direct light from the light source of the light source 130 to one or more of the first set of plants 190A and the second set of plants 190B at a second emission direction 160B using the light redirection element 140. In the illustrated embodiment, the luminaire 108 is configured in an interlighting configuration in which a substantial portion (e.g., a major portion) emitted by the light source of light source 130 is redirected by light redirection element 140 in the second emission direction 160B to fall upon lateral sides of one or more of the first set of plants 190A and the second set of plants 190B.

Pursuant to some embodiments, the movement mechanism 110 may be operated to move or position the light source 130 and the light redirection element 140 substantially simultaneously. In some embodiments, the light source 130 and the light redirection element 140 may be moved or repositioned in a stepwise fashion. In general, embodiments allow the movement of both the light source 130 and the light redirection element 140 to cause them to be positioned in a desired manner of operation (e.g., substantially in a top light manner of operation, substantially in an interlighting manner of operation, or somewhere in between) to deliver light to plants in a greenhouse as described herein.

In accordance with one or more embodiments, light source 130 may be positioned in any desired vertical position along the first set of plants 190A and the second set of plants 190B to achieve a desired distance between light source 130 and light redirection element 140 provide top lighting, interlighting, or a desired combination of top lighting and interlighting to the first set of plants 190A and the second set of plants 190B. Although various embodiments are described as directing light emitted from luminaire 108 onto one or more of the first set of plants 190A and the second set of plants 190B, it should be understood that in other embodiments the light emitted from luminaire 108 may be directed upon any desired object or set of objects.

Reference is now made to FIG. 1B where the greenhouse 100 is again depicted with sets of plants 190A and 190B. In the embodiment depicted in FIG. 1B, the luminaire 108 has been positioned into an interlighting position. More particularly, the light source 130 and the light redirection element 140 are positioned lower (nearer the base of the plants 190A, 190B). Further, the light redirection element 140 is positioned closer to the light source 130 such that the light emitted from the light source 130 is redirected towards the plants 190A, 190B (as shown by the arrows indicating the second emission direction 160B). Pursuant to some embodiments, to reposition the light source 130 and the light redirection element 140 from the position of FIG. 1A to the position of FIG. 1B, the movement mechanism 110 was operated to cause the light source 130 and the light redirection element 140 to be lowered (although the light redirection element 140 was lowered at a slower speed or pace than the light source 130).

Figure 2B:
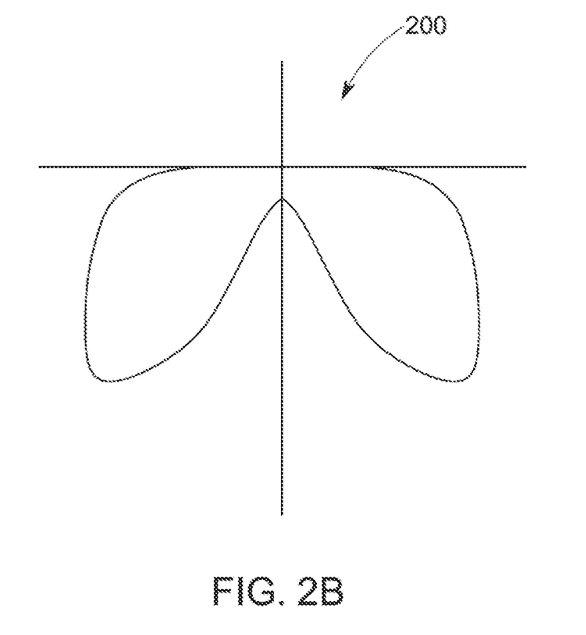
FIG. 2B is an illustration of a beam pattern of a light source of the luminaire of FIG. 1B.

FIG. 2B depicts an illustrative cross sectional view of the beam pattern of the light emitted from the light source 130 positioned as shown in FIG. 1B. As shown in FIG. 2B, the beam pattern is substantially horizontal (towards the plants in FIG. 1B). The lesser distance from the light source 130 and the light redirection element 140 results in a different light redirection ration as compared to the beam pattern of FIG. 1A. In the case where the luminaire 108 is positioned as shown in FIG. 1B, the decreased distance between the light source 130 and the light redirection element 140 has a greater impact on the beam pattern than the position of FIG. 1A. Those skilled in the art, upon reading the present disclosure, will appreciate that the distance between the light source 130 and the light redirection element 140 may be controlled to selectively produce different beam patterns. Further the relative height (as compared to the plants 190A, 190B) may also be controlled to selectively produce different top or interlighting characteristics. By controlling both the height of the luminaire 108 as well as the distance between the light source 130 and the light redirection element 140, embodiments provide a previously unattainable level of control on the delivery of light to different plant areas.

Figure 3A:
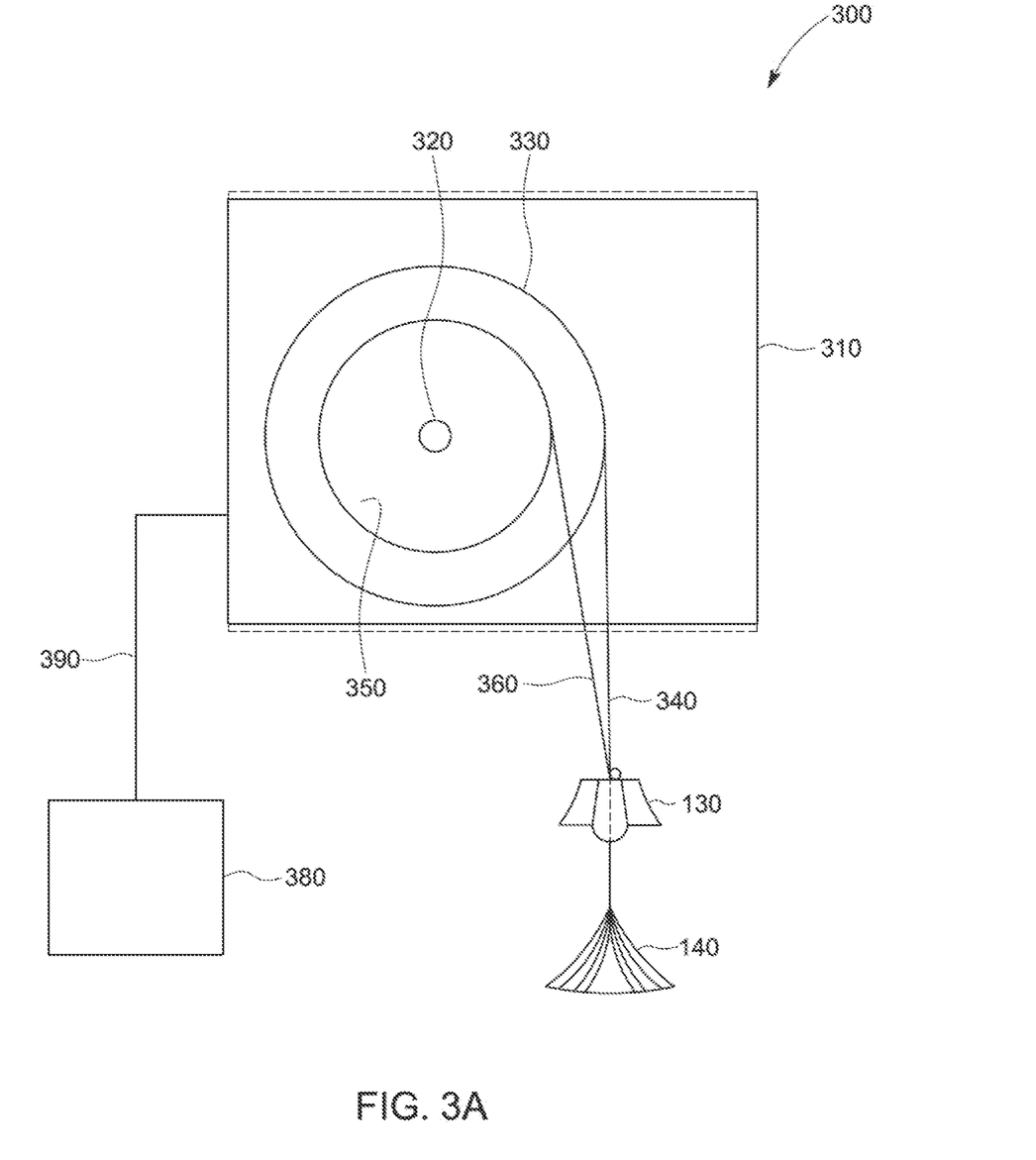
FIGS. 3A and 3B are views of movement mechanisms pursuant to some embodiments.

FIG. 3A is a view of a movement mechanism 300 for the luminaire 108 in accordance with some embodiments. The movement mechanism 300 is an example of the movement mechanism 110 of FIGS. 1A and 1B. The movement mechanism 300 includes a control system 380 operatively connected via a wired or wireless interface 390 to one or more motors 310. The motor 310 has a shaft 320 coupled to the motor 310. The movement mechanism 300 further includes a first wheel 330 coupled to the shaft 320. The first wheel 330 is further coupled to the light source 130 by a first cable 340. In the illustrated embodiment, an end of the first cable 340 is coupled to the light source 130 and a portion of the first cable 340 is wound around a portion of the first wheel 330.

The movement mechanism 300 further includes a second wheel 350 coupled to the shaft 320. The second wheel 350 is further coupled to the light redirection element 140 by a second cable 360. In the illustrated embodiment, an end of the second cable 360 is coupled to the light redirection element 140 and a portion of the second cable 360 is wound around a portion of the second wheel 350. In a particular embodiment, a diameter of the first wheel 330 is greater than a diameter of the second wheel 350. During rotation of shaft 320 by motor 310, first wheel 330 and second wheel 350 are rotated to provide a first vertical movement rate of light source 130 that is greater than a second vertical movement rate of the light redirection element 140. For example, the movement mechanism 300 may be operated to selectively position the light source 130 and the light redirection element 140 in positions such as those shown in FIGS. 1A and 1B.

Although the embodiment illustrated in FIG. 3A is shown as using a single motor, it should be understood that in other embodiments one or more motors and shafts may be used. In some embodiments, the movement mechanism 300 may be operated using a control system 380 which allows an operator to selectively position the light source 130 and the light redirection element 140. While the first cable 340 and second cable 360 are referred to as "cables", they may instead or additionally be formed from chains, ropes, belts, wires or the like.

Figure 3B:
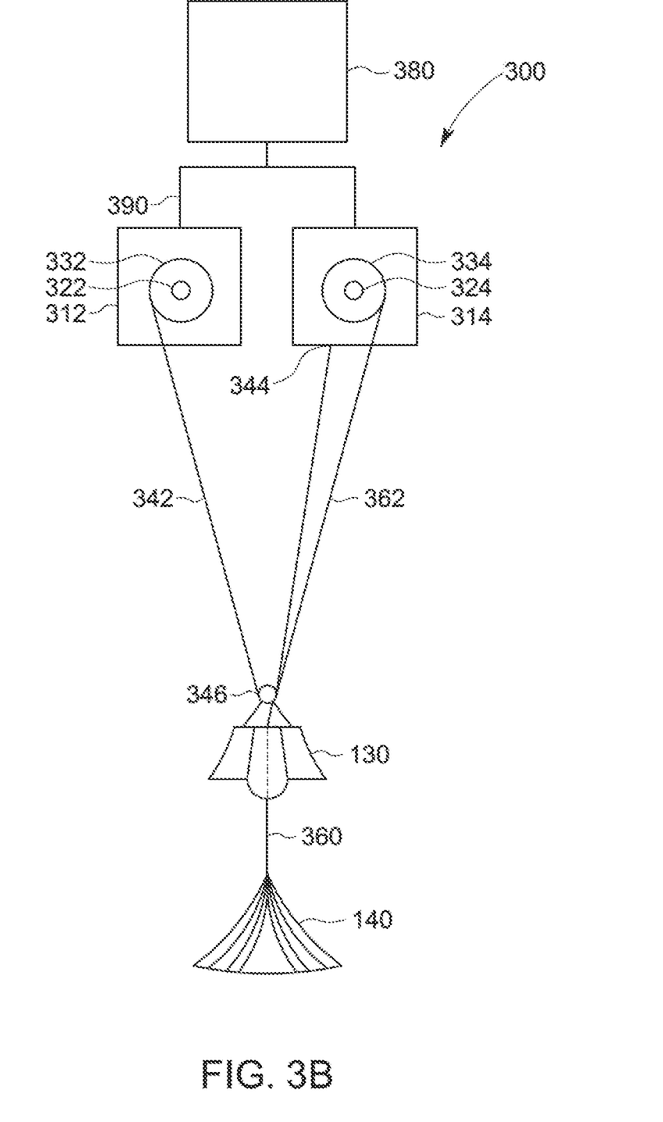

Reference is now made to FIG. 3B where a further embodiment of a movement mechanism 300 pursuant to some embodiments is shown. As depicted, the movement mechanism 300 includes a control system 380 operatively connected via a wired or wireless interface 390 to a first motor 312 and a second motor 314, where the first motor 312 includes a drive shaft 322 and a drive wheel 332 which is connected to a first cable 342 that is connected to the light source 130. In the example embodiment depicted in FIG. 3B, the first cable 342 loops through an attachment point 346 on or attached the light source 130 and the first cable 342 is connected at one end 344 to the second motor 314 at a fixed position such that when the first motor 312 extends or retracts the first cable 342, the light source 130 lowers or raises. As shown in the illustrative example of FIG. 3B, the second motor 314 is connected to the light redirection element 140 via a second cable 362. In the depicted embodiment, the second cable 362 is routed through a via or recess in the light source 130. Pursuant to some embodiments, both the first motor 312 and the second motor 314 may be controlled by a control system 380 to selectively position the light source 130 and the light redirection element 140.

Those skilled in the art, upon reading the present disclosure, will appreciate that other types of movement mechanisms 300 may be used to control the positioning of the components of the luminaire 108 of the present invention. In some embodiments, the control system 380 may be programmed or configured to selectively position a plurality of light sources 130 and light redirection elements 140 in a greenhouse such that all (or a plurality) of the luminaires 108 are positioned in either a top lighting or interlighting mode of operation. In some embodiments, an operator may interact with the control system 380 to perform the positioning. In some embodiments, the control system 380 may be configured to substantially automatically perform the positioning.

Figure 4A:
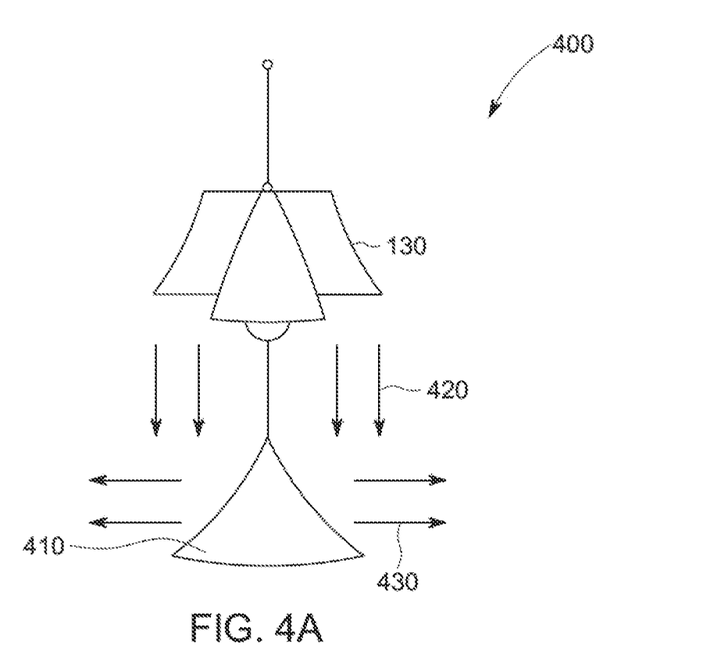
FIGS. 4A & 4B are views of some components of a luminaire pursuant to some embodiments.
Figure 4B:
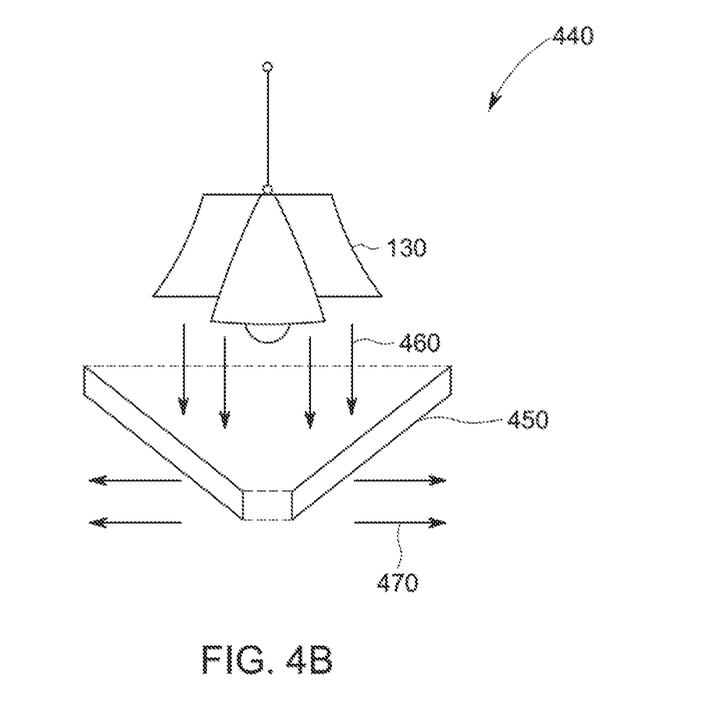

FIGS. 4A & 4B are views of portions of a luminaire 108 pursuant to some embodiments of the present invention and illustrate different light redirection element configurations pursuant to some embodiments. For example, FIG. 4A illustrates an embodiment of a luminaire 400 having a light redirection element 410 in the form of a reflector coupled to a light source 130. In the embodiment of FIG. 4A, light emitted by light source 130 in a first direction 420 (e.g., substantially downward) is reflected by the reflector-style light redirection element 410 to a second direction 430 (e.g., substantially laterally). As such, when the light redirection element 410 is positioned relatively near a light source (such as in the embodiment depicted in FIG. 1B), the luminaire 400 acts to provide interlighting.

FIG. 4B illustrates an embodiment of a luminaire 440 having a light redirection element 450 in the form of a total internal reflection (TIR) lens positioned near to a light source 130. In the embodiment depicted in FIG. 4B, light emitted by light source 130 in a first direction 460 (e.g., substantially downwardly) is redirected by the TIR lens of the light redirection element 450 to a second direction 470 (e.g., substantially laterally). As such, when the light redirection element 450 is positioned relatively near a light source (such as in the embodiment depicted in FIG. 1B), the luminaire 440 acts to provide interlighting.

Although the embodiments illustrated in FIG. 4A and FIG. 4B show a reflector and a TIR lens used as light redirection elements 410, 450, it should be understood that in other embodiments any suitable light redirection element may be used.

Figure 5:
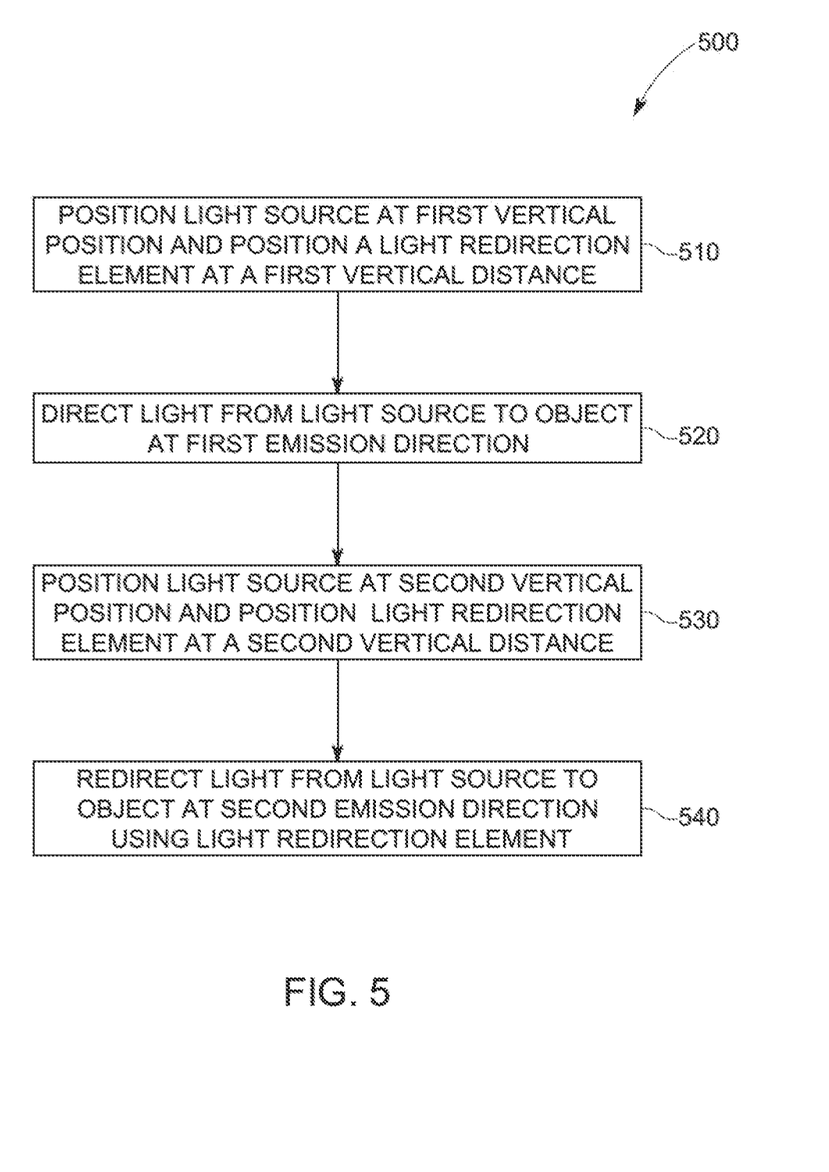
FIG. 5 is a flowchart illustrating a method for top lighting and interlighting using a luminaire assembly with a movable light source in accordance with an exemplary embodiment of the present disclosure.

FIG. 5 is a flowchart illustrating a method 500 for top lighting and interlighting using a luminaire (such as the luminaire 108 depicted in FIGS. 1A and 1B) with a movable light source in accordance with an exemplary embodiment of the present disclosure. The method 500 includes steps 510-540. In step 510, a light source is positioned at a first vertical position and the light redirection element is positioned at a first vertical distance from the light source at a first time. In one or more embodiments, a movement mechanism simultaneously or stepwise moves the light source at a first vertical movement rate and the light redirection element at a second vertical movement rate. In particular embodiments, the movement mechanism is separately coupled to the light source and the light redirection element.

In step 520, light from the light source is directed to an object at a first emission direction. In step 530, the light source is positioned at a second vertical position and the light redirection element is positioned at a second vertical distance from the light source at second time. In step 540, light from the light source is redirected to the object at a second emission direction using the light redirection element.

One or more embodiments described herein provide for top lighting and interlighting luminaire assemblies with movable light sources for interior plant growth stimulation. One or more embodiments may provide for an advantage allowing a luminaire to be positioned at any desired position to allow for top lighting and interlighting from a single luminaire without requiring a separate top lighting luminaire and an interlighting luminaire. Another advantage that may be provided by one or more embodiments is enabling a more uniform inter-canopy light distribution of light emitted by the luminaire. Advantageously, as a result of this disclosure, a single luminaire may be utilized year round to add top lighting when the sunlight level is low as well as provide interlighting when the sunlight level is high, since it is desirable to provide a top lighting and interlighting luminaire assembly with movable light source for greenhouse or interior plant growth stimulation.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

The invention claimed is:

1. A lighting system, comprising:
   a light source;
   a light redirection element; and
   a movement mechanism coupled to the light source and to the light redirection element, the movement mechanism configured to move the light source and the light redirection element between (i) a first orientation in which the light redirection element is positioned apart from the light source such that light from the light source is emitted in a first emission direction, and (ii) a second orientation in which the light redirection element is positioned near the light source such that light emitted by the light source is emitted in a second emission direction.

2. The lighting system of claim 1, wherein the movement mechanism is configured to move the light source at a first vertical movement rate and the light redirection element at a second vertical movement rate.

3. The lighting system of claim 1, wherein the first orientation is a top lighting orientation and the second orientation is an interlighting orientation.

4. The lighting system of claim 1, wherein the movement mechanism is further configured to move the light source and the light redirection element in a stepwise fashion.

5. The lighting system of claim 1, the movement mechanism further comprising:
   a motor;
   a shaft coupled to the motor;
   a first wheel coupled to the shaft, the first wheel further coupled to the light source; and
   a second wheel coupled to the shaft, the second wheel further coupled to the light redirection element.

6. The lighting system of claim 5, wherein a diameter of the first wheel is greater than a diameter of the second wheel.

7. The lighting system of claim 2, wherein the first vertical movement rate is greater than the second vertical movement rate.

8. The lighting system of claim 1, wherein the light source is at least a first light emitting diode (LED).

9. The lighting system of claim 1, wherein the light redirection element includes at least one of a reflector and a lens.

10. The lighting system of claim 1, wherein the light in the first emission direction is directed substantially to a top surface of an object.

11. The lighting system of claim 1, wherein the light in the second emission direction is directed substantially to a lateral surface of an object.

* * * * *